United States Patent [19]
Akashi et al.

[11] 3,887,349
[45] June 3, 1975

[54] APPARATUS FOR MANUFACTURING RIBBON GLASS HAVING A METAL OXIDE COATING

[75] Inventors: Naotomo Akashi, Maizuru; Katsuji Fujimoto, Ichihara, both of Japan

[73] Assignee: Nippon Sheet Glass Co., Ltd., Osaka, Japan

[22] Filed: Nov. 27, 1973

[21] Appl. No.: 419,280

[30] Foreign Application Priority Data
Dec. 6, 1972 Japan............................ 47-122932

[52] U.S. Cl. .......................... 65/161; 65/60; 65/181
[51] Int. Cl. ............................................ C03c 17/00
[58] Field of Search .............. 65/60, 161, 162, 181; 117/107.2 R, 119, 124 A, 105.3; 118/49.1, 50.1

[56] References Cited
UNITED STATES PATENTS
3,689,304  9/1972  Bamford ............................ 65/60 X Primary Examiner—Arthur D. Kellogg
Attorney, Agent, or Firm—Wenderoth, Lind & Ponack

[57] ABSTRACT

This invention relates to an apparatus for forming a coating of metal oxides on the surface of ribbon glass. When ribbon glass having the aforesaid metal oxide coating is manufactured with the conventional apparatus, there appears those in which this metal oxide coating is not normal or in which the product is of poor quality. For instance, there are those whose reflectivity of visible rays is small or those in which there are formations of spotted defects in the surface of the ribbon glass. In consequence of our investigations into the cause of the foregoing deficiencies, we found that the principal role was played by the temperature of the atmosphere of the locale where the solution of metal oxides was sprayed. And as a way to eliminate this cause, we conceived of blowing in a heated gas separately. That is, the temperature of the spraying locale was maintained under optimal conditions by adjusting the temperature and amount of the heated gas blown in. In this way, not only the amount of poor quality products were reduced greatly but also products of better quality were obtained.

2 Claims, 7 Drawing Figures

APPARATUS FOR MANUFACTURING RIBBON GLASS HAVING A METAL OXIDE COATING

This invention relates to a method and apparatus for forming a coating of metal oxides on the surface of ribbon glass. More particularly, this invention relates to a method and apparatus for forming a film of metal oxides continuously on the surface of ribbon glass by spraying thereon a solution of metal compounds at a point in the neighborhood of the inlet to a lehr or the inside thereof when the ribbon glass is being conveyed to the lehr after it has been formed from molten glass. The adhesion of a film of metal oxides to ribbon glass as described above has been practiced heretofore and is not a new procedure. However, there was the drawback that excellent products could not be obtained at all times with the conventional procuedure. As a result of having exerted our efforts with a view to overcoming the foregoing drawbacks, we arrived at the present invention.

First of all, the conventional apparatus will be briefly described. In this apparatus a locale where the temperature of the ribbon glass is about 400°- 600°C., for example, the neighborhood of the inlet to the lehr, is chosen, and a solution of metal compounds is sprayed onto the surface of the ribbon glass with a spray gun. In this case, the metal compound solution is one which decomposes at a lower temperature than that at the time of the processing of the ribbon glass. And as the spraying means, a spraying device which travels or oscillates transversely of the direction of advance of the ribbon glass may be employed. Thus, the thermal decomposition of the aforesaid metal compounds takes place to form an oxide coating on the surface of the ribbon glass, while the decomposition gas generated during the thermal decomposition of the foregoing solution is removed by suction from the vicinity of the surface of said ribbon glass with an exhaust device. While it should be possible by using the hereinabove-described apparatus to manufacture metal oxide-coated ribbon glass that conforms to the prescribed grade, as a practical matter unsatisfactory products such as described below appear. For instance, among the unsatisfactory products, there are some in which the metal oxide coating formed on the surface of the glass is abnormal and has only small reflectivity of visible rays. Again, there are instances in which there are the formation of spotted defects on the order of several millimeters in diameter on the glass surface. When this kind of unsatisfactory products appear, the quality of the product becomes instable, and there is a marked decline in the yield of the product. In consequence of our extensive research as to why these defects appeared, we conjectured that the cause thereof resided in the temperature of the atmosphere of the spraying locale. This presumption was arrived at in the following manner. First, a case where the temperature of the atmosphere of the spraying locale is exceedingly high and, in contrast, a case where this temperature is very low are considered. By the foregoing high temperature is meant a temperature on the order which will readily cause thermal decomposition of the sprayed metal compounds. On the other hand, by low temperature is meant that the temperature of the spraying locale has dropped to such an extent that the gas vaporized at the vicinity of the glass surface again condenses at the vicinity of the exhaust opening, i.e., the suction port.

When the aforementioned atmospheric temperature is high, the defect that can be found is that the reflectivity of the metal oxide coating formed on the surface of the ribbon glass with respect to visible rays becomes small. It is presumed that the cause for this is that when the temperature of the atmosphere of the spraying locale becomes a high temperature as noted hereinbefore the sprayed solution of metal compounds thermally decomposes and gasifies before it reaches the surface of the ribbon glass, with the consequence that the metal compounds separate into the atmosphere and thus do not adhere to the surface of the glass.

Next, the defect that can be found when the temperature of the atmosphere of the spraying locale has dripped is that there are formations of spotted defects on the order of several millimeters in diameter on the surface of the ribbon glass. It is conceivable that the cause in this case is that when the temperature of said atmosphere is low, the solution of the metal compounds, even though it has once been gasified, again condenses on the inside walls of the suction ports, the outlet for said gas, or the inside walls of the exhaust ducts and then drops onto or become adhered to the ribbon glass like drops of water and thermally decomposes to form a nonuniform coating of metal oxides.

Next, the temperature condition of the atmosphere of the spraying locale will be examined. In the conventional apparatus, the decomposition gas evolved in the spraying locale, as hereinbefore-noted, is removed with an exhaust device. This exhaust device has suction ports disposed near the surface of the ribbon glass and is adapted to discharge the sucked waste gas externally of the apparatus via ducts, using an exhaust fan. In this case, the temperature of the spraying locale varies depending upon the suction capacity of the aforesaid exhaust fan. For instance, if the suction capacity of the exhaust fan is great, the amount of gas discharged from the spraying locale is increased. A large amount of outside air is contained in this exhaust gas in addition to the vaporized gas. This is because the suction ports for carrying out the exhaust operation open towards the spraying locale mainly, and hence the outside air is sucked in via the spraying locale. The temperature of the atmosphere of the spraying locale thus drops as a result of this outside air that has been sucked in. When the temperature of the atmosphere of the spraying locale drops in this manner, spotted defects are formed in the surface of the ribbon glass, as hereinbefore noted.

On the other hand, when the suction of the aforesaid exhaust fan is reduced, the amount of incoming air is reduced along with a reduction in the amount of the waste gas. In consequence, the temperature of the atmosphere of the spraying locale rises. Depending upon the extent of this temperature rise, the reflectivity of the metal oxide coating adhered to the ribbon glass becomes small, as hereinbefore noted. On the other hand, in the case the aforementioned decomposition gas is not thoroughly removed from the spraying locale, the detained decomposition gas might become the cause of reducing the purity of the metal oxide coating adhered to the ribbon glass.

As a consequence of observations and reasonings, such as above described, it was found that the temperature of the atmosphere of the spraying locale must neither be too high nor too low. It is necessary to maintain a prescribed proper temperature. Thus, not only is the adhesion of the metal compounds enhanced, but also the reflectivity, with respect to visible rays, of the adhered metal oxide coating can be increased.

There is however one obstacle to the maintenance of the foregoing proper temperature. This obstacle is the entry into the spraying locale of air of low temperature from the surrounding space, when, as hereinbefore described, the waste gas is removed by suction. When the conventional apparatus is employed, it frequently happens that the temperature of the atmosphere of the spraying locale drops, with the consequence that spotted defects are formed on the surface of the ribbon glass. This was the result of the entry of outside air into the spraying locale. When the operations are carried out under such conditions, a fluctuation in the temperature of the outside air not only affects the spraying locale but also makes for difficulty in controlling the temperature of the atmosphere of the spraying locale so as to fall within a given range because of this entry of outside air. As a consequence, the state of formation of the metal oxide coating on the glass surface becomes instable. Hence, there is the serious drawback that products of uniform quality cannot be obtained.

The present invention, which has as its object the removal of the foregoing deficiencies, has contrived a means of maintaining the temperature of the atmosphere of the spraying locale at a proper temperature, the concept being that in the conventional apparatus the inside temperature of the spraying locale was caused to fall as a result of the outside air of relatively low temperature being sucked into the spraying locale, and thus by feeding a heated gas into said spraying locale instead of the outside air, the temperature thereof could be maintained at a proper temperature. In practicing the invention, means are adopted so as to make it possible to freely adjust the temperature as well as the amount of the heated gas being fed.

The foregoing proposal may appear to be very simple, but its practical value is great. Now, the various conditions that must be satisfied in practicing the gist of the present invention will be outlined below.

In practicing the present invention, a number of incidental apparatuses are required. For instance, incidental apparatuses are the apparatus for conveying the ribbon glass, the lehr for said ribbon glass, the spray guns which travel or oscillate along the surface of the ribbon glass transversely of the direction of advance thereof at a point where the temperature of said ribbon glass exceeds 400°C., means for feeding a solution of metal compounds to said spray guns, and exhaust devices disposed at both sides in the vicinity of the course of travel or oscillation of said spray guns and adapted to remove the decomposition gas that evolves in the spraying locale. In the present invention the following conditions are further added: i.e., the provision of blow openings for blowing a heated gas uniformly into the spraying locale, a burner in communication with the aforesaid blow openings via ducts, and means for delivering to the aforesaid blow openings under pressure the gas resulting from the combustion of fuel at the burner. The temperature of the heated gas to be blown into the spraying locale by employment of the above means will also vary depending upon the solution of metal compounds convertible to metal oxides that is used in the present invention, but in the case of, for instance, the solution of the metal acetylacetonates, a temperature of about 180°–400°C. is preferred.

Further, while the amount of this heated gas blown in will also vary depending upon the amount of the so-called waste gas that is to be removed from the aforesaid spraying locale, the amount is usually less than that of the waste gas.

Since the temperature of the atmosphere of the spraying locale is adjusted by blowing in a heated gas in this invention, the temperature of the atmosphere of the spraying locale is not affected by the temperature fluctuations of the outside air. And since it is possible to maintain the temperature of said atmosphere constant, the metal oxide coating adhered to the glass is one the optical properties of which are uniform. Thus, by blowing in a heated gas to the spraying locale in the manner described above, it becomes possible to maintain the temperature of the atmosphere of said locale at its optimum. In consequence of the maintenance of this optimum temperature, the rate of adhesion of the metal oxide coating to the glass is enhanced, the reflectivity of visible rays of the adhered metal oxide coating is increased and the formation of spotted defects in the coating is prevented. Hence, a glass product of better quality and a yield which has been improved can be expected.

It must be further emphasized that if the exhausting of the gas from the spraying locale is not carried out thoroughly and a part of the vaporized gas remains therein, the purity of the metal oxide coating adhered to the glass declines. In the past, as means of coping with this problem, steps were taken to enhance the exhausting operation, i.e., by increasing the amount of gas exhausted, but there was brought about a concomitant drop in temperature of the atmosphere, which, in turn, brought about a decline in the quality of the glass product. However, in accordance with the present invention, it is possible to preclude the drop in the temperature of the atmosphere of the spraying locale even though a large amount of waste gas is exhausted by strong suction. Thus, it becomes possible to remove the vaporized gas from the spraying locale completely. By operating in this manner, the metal oxide coating adhered to the glass becomes one having excellent optical properties.

As the metal compounds that are convertible to metal oxides and are usable in practicing the present invention, mention can be made of the organic compounds of such metals as chromium, iron, cobalt, tin, titanium, calcium and magnesium. For instance, usable are the acetates of these metals, the metal acetylacetonates, or dimethyl tin-2-propionic acid ester or the metallo-fatty acid esters such as titanium esters. Further, in the case where ribbon glass coated with metal oxides ahd having electroconductivity is to be manufactured by the present invention, the inorganic or organic metal compounds of metals such as tin, indium or antimony are used.

Next, as the solvent to be used in this invention for dissolving the aforesaid metal compounds, usable are the organic solvents such as alcohols, benzene, toluene, xylene, chloroform, methylene chloride and pyridine, especially preferred being methanol and benzene in view of their dissolving power.

An object of the present invention resides in manufacturing ribbon glass in which the adhesion of the metal oxide coating is high and the reflectivity of visible rays of said coating is great, this being achieved by maintaining the temperature of the atmosphere of the spraying locale at its optimum by blowing a heated gas into the spraying locale where a solution of metal compounds is being sprayed onto the ribbon glass surface for forming a metal oxide coating thereon.

Another object of the invention is to ensure that no vaporized gas remains behind in the spraying locale by carrying out a vigorous exhausting operation while the temperature of the atmosphere of said spraying locale is being maintained at its optimum by blowing therein a heated gas, thereby ensuring that ribbon glass the adhered metal oxide coating of which has excellent optical properties is obtained.

The present invention has been briefly described hereinbefore, but the expression "temperature of the atmosphere of the spraying locale," which has been frequently used herein, needs to be examined further. The environment of the spraying locale may be described in the following manner. The bottom floor is occupied by the traveling ribbon glass the temperature of which is 400°– 600°C. The spraying of the solution of metal compounds is carried out above this floor. This spraying is however not carried out in a steady state. The spraying takes place by the spray gun traversing across the traveling floor. Hence, when one portion of the floor is considered, the spray arrives at this portion periodically with a given time intervening. Each time this happens decomposition gas is generated. That is, in the spraying locale, the decomposition gas does not evolve uniformly. Further, there is the provision at both sides of the traversing spray guns of an exhaust device having exhaust suction ports disposed near the floor, through which suction ports the waste gas from the spraying locale is eliminated. It can thus be seen that the evolution of gas inside the spraying locale and its movement are highly complex. The temperature distribution within the gas inside said spraying locale is still more complex. As a general tendency, the temperature of that part near the floor is high, the temperature tending to become lower as the distance from the floor becomes greater. Thus, the temperature of the atmosphere of the spraying locale exhibits a state of confusion and cannot be comprehended. However, it is fully possible to measure the temperature of the waste gas that has entered from the exhaust suction ports. Now, if this is designated the exhaust temperature, it would be possible to consider that this temperature represents the temperature condition inside the spraying locale, say, the average of all of the temperatures therein. However, at the vicinity of the suction ports there is the direct entry of outside air, which cannot be avoided. This outside air will probably have a slight influence on the foregoing exhaust temperature. When this is considered, the exhaust temperature cannot be said to accurately represent the average temperature of the gas present inside the spraying locale. However, it can be readily imagined that the values of these two temperatures are very close. For this reason, it is permissible at times to take the exhaust temperature, a temperature that can be measured, and consider this temperature to represent the temperature of the atmosphere of the spraying locale.

The drawings illustrate one embodiment of the present invention.

Figure 1:
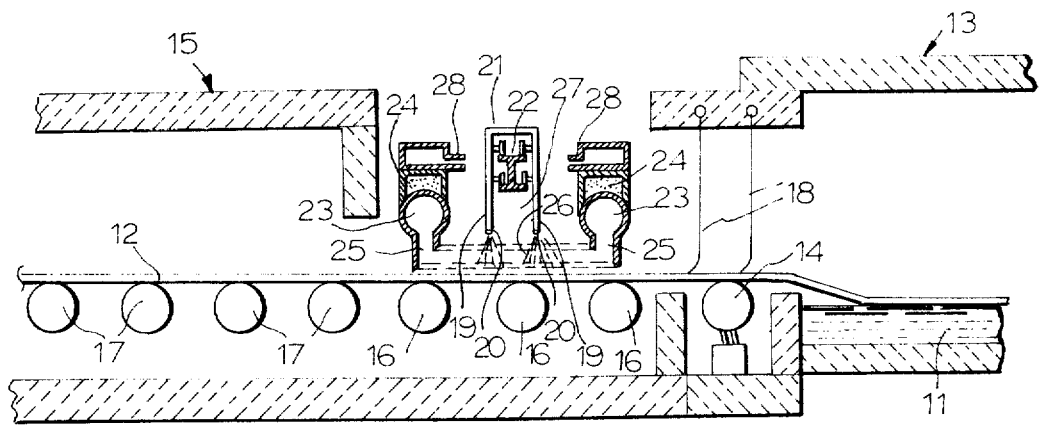
FIG. 1 is a side elevation in longitudinal section taken along the line 1—1 of FIG. 2.
Figure 2:
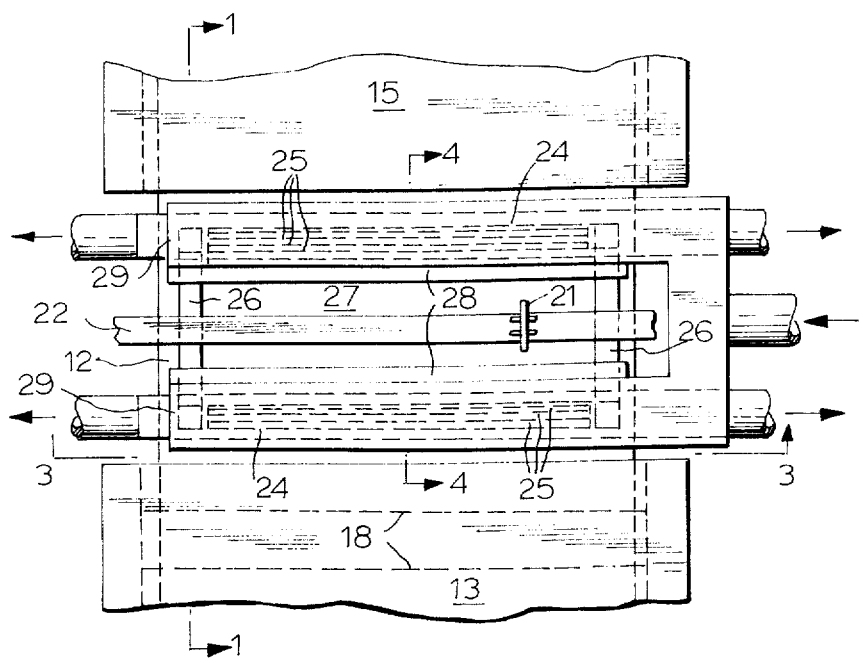
FIG. 2 is a plan view.
Figure 3:
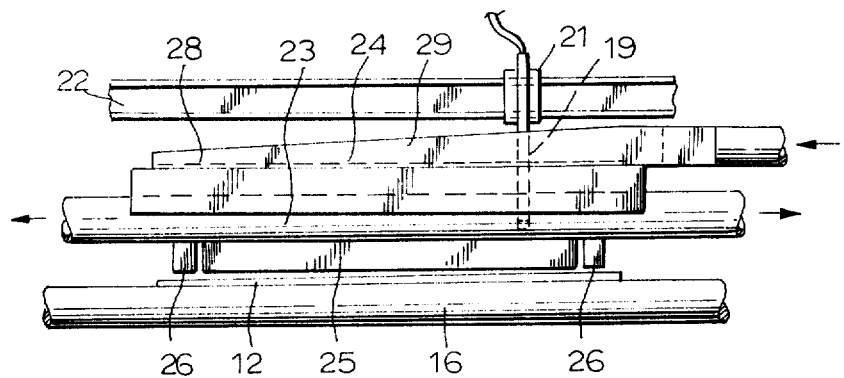
FIG. 3 is a front elevation in transverse section taken along the line 3—3 of FIG. 2.

For more fully illustrating the invention, an embodiment thereof will be described by reference to the accompanying drawings.

FIGS. 1 to 4 illustrate the so-called float-glass manufacturing equipment in which molten glass is flowed out at a constant rate on to a molten metal bath 11, and a layer of glass is formed by advancing it over the molten metal bath 11, where it is cooled to produce a ribbon glass 12. In this equipment, a pick-up roll 14 to pick up the ribbon glass 12 from a bath tank 13 of the molten metal bath 11, conveyer rolls 16 to convey the ribbon glass 12 pulled out by the pick-up roll 14 to a lehr 15, and lehr rolls 17 to further advance the ribbon glass 12 through the lehr 15 are provided.

The ribbon glass 12 is cooled gradually as it is advanced through the lehr 15 by the lehr rolls 17. A heat resistant asbestos curtain 18 is suspended from the ceiling of bath at the outlet of the molten metal bath 13 in order to shut out the outside air from the atmospheric gas of the molten metal bath 11. This curtain extends laterally of the ribbon glass 12.

Figure 4:
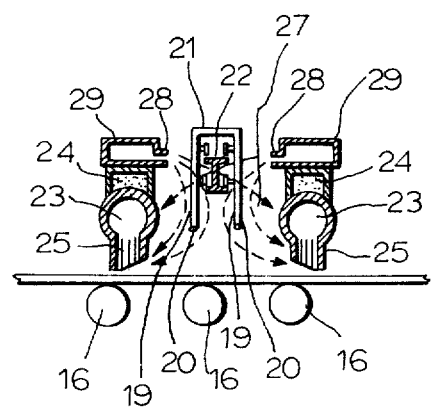
FIG. 4 is a side elevation in longitudinal section taken along the line 4—4 of FIG. 2.

Nozzles 20 of two spraying devices 19, disposed in spaced relationship face the upper surface of the ribbon glass 12 which is at a temperature of about 600°C., which glass after having been pulled out from the molten metal bath 13 is at a point immediately in front of the inlet to the lehr 15. As shown in FIG. 1 and 4, the spraying devices 19 are disposed at a suitable distance above the upper surface of the ribbon glass 12 and are secured to a supporting member 21 in such a manner they face the upper surface of the ribbon glass 12. The supporting member 21 travels reciprocatingly transversely of the direction of travel of the ribbon glass 12 along a guide rail 22 set up in parallel to the surface of the ribbon glass and at right angles to the advancing direction of the ribbon glass 12.

A pair of gas exhaust ducts 23 which extend along both sides of the course of travel of the spraying devices 19, and the ends of which are connected to an exhaust device (not shown) communicate with transverse suction ports 25 (FIG. 4), which extend along the upper surface of the ribbon glass 12, and longitudinal suction ports 26, which extend along the upper side surface of the ribbon glass 12. Thus, the spraying locale (the place where the spraying is carried out) is defined by the ribbon glass 12 and the exhaust ducts 23 covered with the insulating material 24 and the members making up the suction ports 25 and 26.

In the upper part of the spraying locale, there are provided along the course of travel of the spraying devices 19 a pair of hereinafter described wind ducts 29 for blowing in a heated gas, say, air. These wind ducts 29 have openings 28, which face the spraying locale side at a higher level than that of the nozzles 20 of the spraying devices 19.

Figure 6:
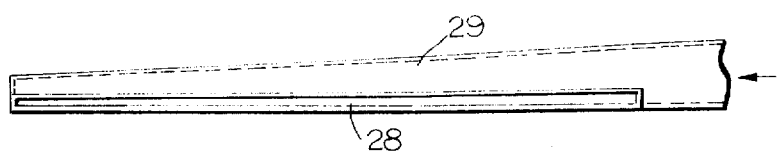
FIGS. 6 and 7 are side elevations of wind tubes.
Figure 7:
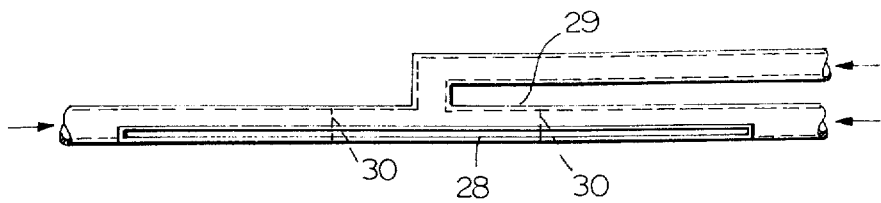

The spraying device 19 has leading out therefrom a line for supplying a solution of the metal compounds, a line disposed in coil fashion about the foregoing line for supplying and circulating cooling water for cooling the inside of the former line in order to prevent vaporization of the solvent in this line until the solution reaches the spray nozzles 20, and a line for introducing to the spray nozzles the pressurized gas necessary for effecting the atomization of the solution. The several lines are directly connected respectively to a tank containing a solution of metal compounds located externally of the spraying chamber, the openings for supplying and draining water and a compressor, or these lines are coupled to fixed pipes, which lead to these tank, openings or compressor. The shape of the aforesaid wind duct 29 is so devised as to ensure the uniformity of the temperature inside the spraying locale 27 in the lateral direction of the ribbon glass. For instance, as shown in FIG. 6, when heated gas is supplied from one end of the wind duct 29, the amount of the heated gas blown is uniformly distributed by narrowing the duct 29 at the other end of the blow openings. Alternately, as shown in FIG. 7, the amount of heated gas blown is distributed uniformly by providing partitioning walls 30 in the wind duct 29 and by supplying the heated gas from three portions of the wind duct 29.

The heated gas to be blown into the foregoing spraying locale is fed from a separately provided heated gas producing device. As this heated gas producing device, a heat exchanger may be used, for example, and the required heated gas may be prepared by transferring the heat of industrial elevated temperature waste gas to a clean gas, or elevated temperature gas obtained by burning town gas or other fuel gas may also be used. A mode of practicing the latter method will be described hereinafter. The temperature of the elevated temperature gas resulting from this combustion is adjusted by mixing it with diluent air. For maintaining the temperature of the heated gas in this case at the prescribed temperature, the temperature of the gas inside the wind ducts 29 is measured, and then the temperature of the heated gas is brought in conformance with the prescribed standard temperature by increasing or decreasing the amount of the diluent air fed. On the other hand, for regulating the amount of the heated gas, the amount of gas fed to the combustion chamber and the amount of air to be mixed therewith are adjusted by means of respective butterfly valves.

Figure 5:
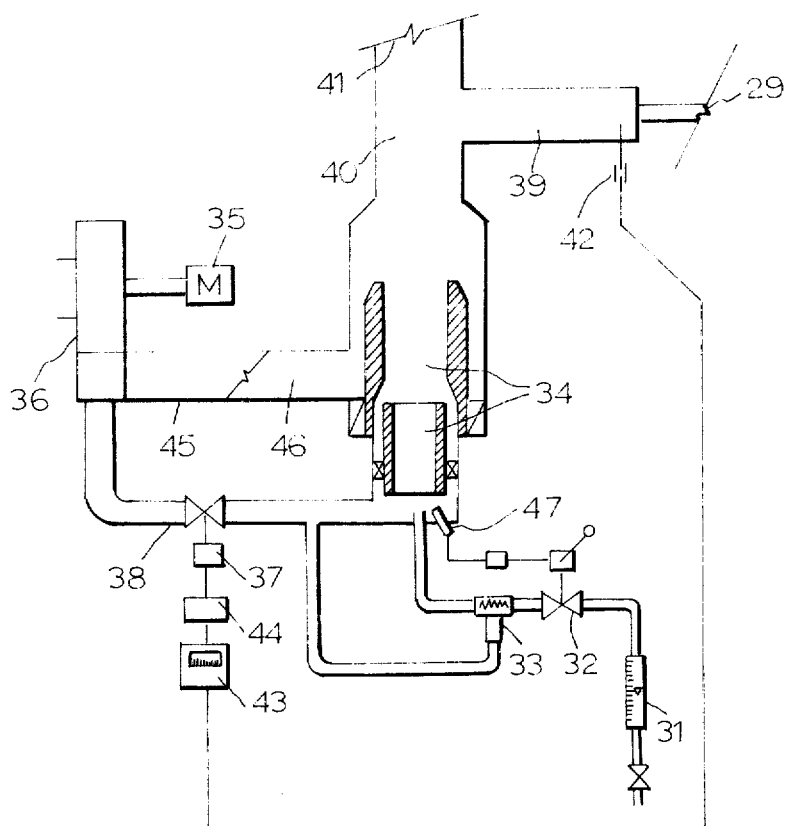
FIG. 5 is a schematic view of a gas generating apparatus.

The device for producing the aforesaid heated gas will be more fully described. As shown in FIG. 5, a combustion chamber 34 is provided in the middle of the device, to which combustion chamber the fuel gas and air for combustion are fed. The prescribed amount of Algas (a trade name) is introduced to a combustion chamber 34 from a tank of Algas (not shown) via a flow meter for gas 31, a cutoff emergency valve 32, and a proportional valve 33 for introducing Algas in accordance with the amount of air required for combustion. On the other hand, the air for combustion is introduced to the combustion chamber for burning the Algas, from the blower 36 through a valve 38 the degree of opening of which is adjusted by a modutrol motor 37. The combustion gas, after being mixed with the diluent air from the blower 36 to adjust it to a suitable temperature, is then introduced to the wind ducts 29 via the heated gas line 39. At an intermediate point along the heated gas line 39, there is provided a branch passage 40 for allowing the contaminated heated gas generated at the ignition period to escape to the outside by opening or closing a butterfly valve 41. Further, a thermocouple 42 is provided at a suitable position in the heated gas line 39, and the thermocouple 42 is connected to a temperature controlling recorder 43, which records the temperature of the heated gas and simultaneously keeps the temperature of the heated gas at a predetermined value by adjusting the degree of the opening of the valve 38 through the servoactuator 42 and the modutrol motor 37. The amount of heated gas supplied to the wind ducts 29 is controlled by the amount of the heated gas delivered and a butterfly valve 46 installed in a duct 45 for supplying the diluent air. The blower 36 for supplying the diluent air also functions as a device to deliver the heated gas to the blow openings 28 under pressure. Further, when a misfire occurs during ignition or the fire goes out in the combustion chamber 34, it is detected by an ultraviolet detector 47 provided therein, and the emergency valve 32 is closed, thus stopping the delivery of Algas and thereby preventing an explosion from occurring in the heated gas delivery duct 39.

A mode of practicing the present invention will now be described by reference to the above-described apparatus. Molten glass, flowing onto a molten metal bath 11 at a constant rate, is caused to advance thereover to form a layer of glass thereon, which is in the meanwhile cooled to form ribbon glass 12. The thus formed ribbon glass is then pulled out of the tank 13 containing the molten metal bath 11 by means of pick-up roll 14 and conveyed into the lehr 15 by means of conveyor rolls 16 and lehr rolls 17 at a constant speed. At a point where the thus manufactured ribbon glass attains a temperature of about 600°C. inside the spraying locale 27, its upper surface is sprayed with a solution of metal compounds by means of nozzles 20 of spraying devices 19, the metal compound solution being delivered from a tank (not shown) containing same. The solution sprayed in this case is a solution consisting of 2.5 weight percent of cobalt acetonate, 2.5 weight percent of chromium acetylacetonate, 2.25 weight percent of iron acetylacetonate and 0.5 weight percent of titanium acetylacetonate and 92.25 weight percent of a 1:1 (volume ratio) methanol and benzene solvent mixture. At this time, cooling water is circulated through the lines (not shown) used for cooling the spraying devices. The supporting member 21 of the spraying devices 19 moves reciprocatingly along the guide rail 22. The spraying devices 19 spray the solution of metal compounds described above uniformly and continuously onto the upper surface of the ribbon glass being conveyed. Algas is burned in the combustion chamber 34 while these spraying devices 19 operate, and the combustion gas is mixed with the diluent air blown in by the blower 36 for delivering air under pressure. The gas is then blown in from the blow openings 28 at the rate of 50 cubic meters per minute at 230°C. The sprayed solution of metal compounds described above decomposes thermally on contacting the glass of high temperature in the spraying locale 27 to form a strong layer of metal oxides as a result of the bonding of metal ions with the active oxygen bonds that are peculiarly present at the surface of elevated temperature glass, following which further growth of the metal oxide film takes place by means of the oxygen contained in, say, the atmosphere. The concomitantly evolved decomposition gas, the metal oxides which, not having adhered to the surface of the glass, which have decomposed, and the atmospheric gas of the spraying locale (to be referred to hereinafter as waste gas) are then removed by suction via the suction ports 25 and 26 at the rate of 100 cubic meters per minute. When gas is blown into the spraying locale 27 via the blow openings 28 while the waste gas is removed by suction via the suction ports 25 and 26, the blown-in gas flows as indicated by the broken lines in FIG. 4 and also serves to prevent the flowing in of cold streams of air to the spraying locale 27 from the outside. The temperature of the waste gas that was removed by the exhaust ducts 23 at this time was 200° ± 10°C. It was thus possible to produce stably by the foregoing method products having uniform optical properties and without any spotted defects.

In contrast, when the delivery of the heated gas from the heated gas blow openings 28 is discontinued, the temperature of the aforementioned waste gas becomes 120° ± 20°C. resulting in the production of products having numerous spotted defects.

By way of experimentation, the temperature of the aforementioned waste gas was also varied by blowing in heated gas of various temperatures from the heated gas blow openings 28. As previously described, the temperature of this waste gas cannot be said to be the same as that of the atmosphere of the spraying locale, but it may be considered as representing the temperature of said atmosphere. When, on the basis of this assumption, the temperature of the waste gas was varied to observe what changes would take place in the reflectivity of the metal oxide coating formed on the glass surface, when the temperature of the waste gas exceeds 350°C. it is seen that an abrupt decrease takes place in said reflectivity. Thus, it can be seen from the foregoing results that good results can be obtained when the temperature of the waste gas ranges between 160° and 350°C.

We claim:

1. In an apparatus for manufacturing ribbon glass having as part thereof means for forming a metal oxide coating on the surface of ribbon glass which is positioned at a spraying locale between means for forming ribbon glass and a lehr or within the lehr, said means for forming a metal oxide coating including spray guns which face the surface of the ribbon glass and movable across the ribbon glass, means for feeding metal compound solution to the spray guns, means for spraying the solution from the spray guns, a pair of exhaust ducts disposed on both sides of the path of travel of the spray guns having suction ports facing downwardly from the exhaust ducts and an exhaust system connected to the exhaust ducts, the improvement comprising wind duct means having openings in the spraying locale, defined by the exhaust ducts and the ribbon glass, for blowing a heated gas into the spray locale, a gas burner means connected to the wind duct means, and diluent air-intake openings disposed in said wind duct means between said burner means and said openings for supplying diluent air to control the temperature of the products of combustion from said gas burner means.

2. An apparatus according to claim 1 wherein said gas burner means has a flame detecting means and an emergency cut off means connected thereto for cutting off the heated gas when a flame cannot be detected by the flame detecting means.

* * * * *